United States Patent
Mayers

(10) Patent No.: US 12,198,122 B2
(45) Date of Patent: *Jan. 14, 2025

(54) AUTOMATIC ALERTING COMMUNICATIONS SYSTEMS AND METHODS

(71) Applicant: Bank of America Corporation, Charlotte, NC (US)

(72) Inventor: Kyle Mayers, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/488,171

(22) Filed: Oct. 17, 2023

(65) Prior Publication Data

US 2024/0046240 A1 Feb. 8, 2024

Related U.S. Application Data

(63) Continuation of application No. 17/343,057, filed on Jun. 9, 2021, now Pat. No. 11,823,162.

(51) Int. Cl.

| | |
|---|---|
| *G06Q 20/00* | (2012.01) |
| *G06Q 20/20* | (2012.01) |
| *G06Q 20/22* | (2012.01) |
| *G06Q 20/32* | (2012.01) |
| *G06Q 20/40* | (2012.01) |
| *G06V 10/75* | (2022.01) |
| *G06V 20/20* | (2022.01) |

(Continued)

(52) U.S. Cl.
CPC ......... *G06Q 20/321* (2020.05); *G06Q 20/209* (2013.01); *G06Q 20/227* (2013.01); *G06Q 20/322* (2013.01); *G06Q 20/4037* (2013.01); *G06V 10/751* (2022.01); *G06V 20/20* (2022.01); *G08B 5/22* (2013.01); *G06V 30/10* (2022.01)

(58) Field of Classification Search
CPC .. G06Q 20/321; G06Q 20/209; G06Q 20/227; G06Q 20/322; G06Q 20/4037; G06Q 20/3223; G06V 10/751; G06V 20/20; G06V 30/10; G08B 5/22
USPC .......................................................... 705/24
See application file for complete search history.

(56) References Cited

U.S. PATENT DOCUMENTS

| | | |
|---|---|---|
| 8,665,089 B2 | 3/2014 | Saigh et al. |
| 9,100,493 B1 | 8/2015 | Zhou et al. |
| 9,210,413 B2 | 12/2015 | Grinberg et al. |

(Continued)

FOREIGN PATENT DOCUMENTS

| | | | | |
|---|---|---|---|---|
| KR | 2014121764 A | * | 10/2014 | ........... G02B 27/017 |
| WO | WO-2013044175 A1 | * | 3/2013 | ............... G06F 8/65 |

*Primary Examiner* — Russell S Glass

(57) ABSTRACT

A system includes a user device and a computing system. The user device accesses a plurality of images captured by a camera and identifies, from the plurality of images, a particular image that depicts a portion of a user interaction object. The user device transmits the particular image across a wireless communications network. The computing system accesses the particular image depicting the portion of the user interaction object and determines a data item from the particular image. The computing system compares the data item to one or more accounts of the user and sends instructions to the user device to display an alert message on the electronic display based on the comparison of the data item to the one or more accounts.

17 Claims, 4 Drawing Sheets

(51) Int. Cl.
  *G08B 5/22*    (2006.01)
  *G06V 30/10*   (2022.01)

(56) References Cited

U.S. PATENT DOCUMENTS

| | | |
|---|---|---|
| 9,547,917 B2 | 1/2017 | Zamer |
| 9,704,154 B2 | 7/2017 | Xing et al. |
| 9,729,998 B2 | 8/2017 | Kreitzer et al. |
| 9,760,698 B2 | 9/2017 | Pisz |
| 9,767,615 B2 | 9/2017 | Young et al. |
| 9,811,818 B1 | 11/2017 | Xing |
| 9,915,545 B2 | 3/2018 | Chen et al. |
| 9,947,215 B2 | 4/2018 | Di Censo et al. |
| 9,996,874 B2 | 6/2018 | Yopp et al. |
| 10,043,238 B2 | 8/2018 | Bean et al. |
| 10,046,601 B2 | 8/2018 | Briggs et al. |
| 10,055,714 B2 | 8/2018 | Zhou et al. |
| 10,147,076 B2 | 12/2018 | Zhou et al. |
| 10,225,721 B2 | 3/2019 | Segal |
| 10,338,400 B2 | 7/2019 | Connor |
| 10,360,907 B2 | 7/2019 | Dayal |
| 10,371,950 B2 | 8/2019 | Dobschal et al. |
| 10,459,534 B2 | 10/2019 | Cherukuri |
| 10,496,887 B2 | 12/2019 | Ernesti et al. |
| 10,565,766 B2 | 2/2020 | Jones et al. |
| 10,643,210 B2 | 5/2020 | Smith et al. |
| 10,768,790 B2 | 9/2020 | Schimke |
| 10,791,938 B2 | 10/2020 | Tzvieli et al. |
| 10,841,265 B2 | 11/2020 | Ban |
| 10,863,032 B2 | 12/2020 | Norris et al. |
| 10,867,450 B2 | 12/2020 | Todeschini |
| 10,868,976 B2 | 12/2020 | Kuehne |
| 10,908,419 B2 | 2/2021 | Gross et al. |
| 11,823,162 B2 * | 11/2023 | Mayers ............... G06V 10/751 |
| 2014/0325556 A1 | 10/2014 | Hoang et al. |
| 2014/0349692 A1 | 11/2014 | Zhou et al. |
| 2015/0230072 A1 | 8/2015 | Saigh et al. |
| 2015/0304300 A1 | 10/2015 | Bender |
| 2016/0012465 A1 * | 1/2016 | Sharp ................... G06Q 20/321 |
| | | 705/14.17 |
| 2016/0171622 A1 | 6/2016 | Perkins et al. |
| 2017/0039599 A1 | 2/2017 | Tunnell et al. |
| 2017/0293740 A1 | 10/2017 | Xing |
| 2018/0157336 A1 | 6/2018 | Harris et al. |
| 2018/0225754 A1 | 8/2018 | Del Vecchio et al. |
| 2018/0288333 A1 | 10/2018 | VanBlon et al. |
| 2018/0349700 A1 | 12/2018 | Percuoco et al. |
| 2019/0056604 A1 | 2/2019 | Tsai |
| 2019/0108524 A1 * | 4/2019 | Nicholson ............ G06Q 20/102 |
| 2019/0114702 A1 * | 4/2019 | Nicholson .......... G06Q 20/4014 |
| 2019/0179409 A1 | 6/2019 | Jones et al. |
| 2019/0251521 A1 | 8/2019 | Cattone |
| 2019/0392452 A1 | 12/2019 | Jivraj et al. |
| 2020/0018964 A1 | 1/2020 | Hillenbrand et al. |
| 2021/0082011 A1 | 3/2021 | Cohen et al. |

* cited by examiner

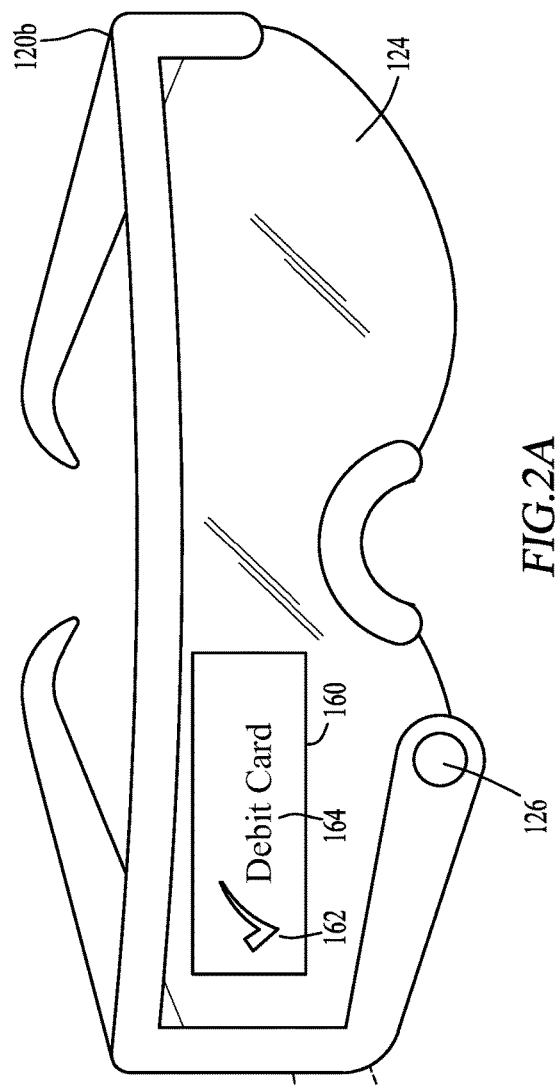
FIG.2A
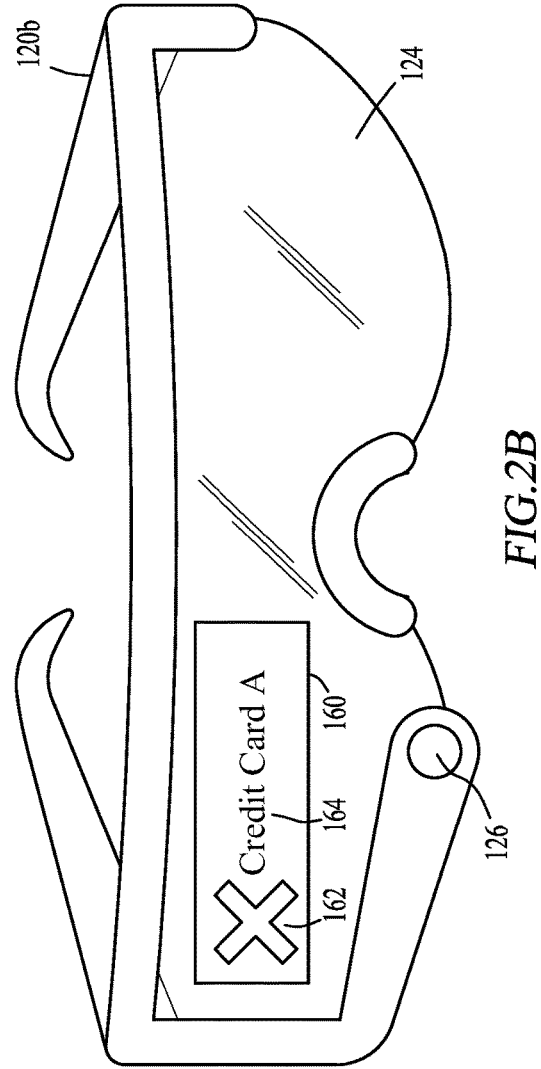
FIG.2B
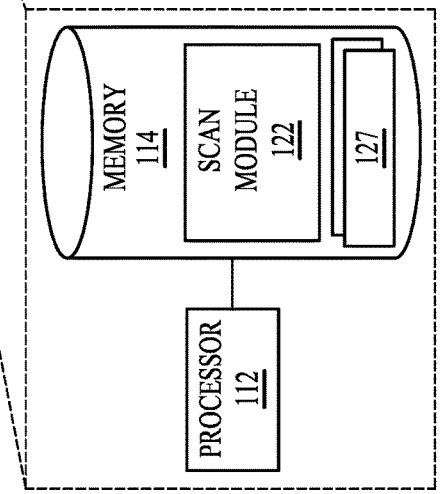

AUTOMATIC ALERTING COMMUNICATIONS SYSTEMS AND METHODS

CROSS-REFERENCE TO RELATED APPLICATIONS

The application is a continuation of U.S. patent application Ser. No. 17/343,057, filed Jun. 9, 2021, by Kyle Mayers, and entitled "AUTOMATIC ALERTING COMMUNICATIONS SYSTEMS AND METHODS," which is incorporated herein by reference.

TECHNICAL FIELD

The present disclosure relates generally to electronic communications, and more specifically to automatic alerting communications systems and methods.

BACKGROUND

Wearable computing devices are being used with increased frequency by users in everyday life. For example, wearable computer glasses that include a computer system and a camera are being worn by users as they perform everyday activities. Wearable devices such as computer glasses typically have augmented reality capabilities where messages and graphics can be displayed to the user directly on the lens as the user views the environment.

SUMMARY

Wearable computing devices are being used with increased frequency by users in everyday life. For example, wearable computer glasses that include a computer system and a camera are being worn by users as they, for example, dine at restaurants, go shopping, and attend sporting events. Wearable devices such as computer glasses typically have augmented reality (AR) capabilities where messages and graphics can be displayed to the user directly on the lens as the user views the environment. This disclosure contemplates utilizing the AR capabilities of wearable computing devices to discretely and automatically alert the user of potentially embarrassing situations before they occur. For example, an alert message may be automatically communicated to a user's wearable device and displayed to the user using AR in response to the automatic detection of certain objects within the user's environment.

In some embodiments, a system includes a user device of a user and a computing system. The user device includes a camera, an electronic display, a first computer processor, one or more first memory units, and a scan module stored in the one or more first memory units. The scan module is configured, when executed by the first processor, to access a plurality of images captured by the camera, identify from the plurality of images a particular image that depicts a portion of a user interaction object, and transmit the particular image across a wireless communications network. The computing system includes a second computer processor, one or more second memory units, and an automatic alerting module stored in the one or more second memory units. The automatic alerting module is configured, when executed by the second processor, to access the particular image depicting the portion of the user interaction object, determine a data item from the particular image, compare the data item to one or more accounts of the user, and send instructions to the user device to automatically display an alert message on the electronic display based on the comparison of the data item to the one or more accounts.

The disclosed embodiments provide several practical applications and technical advantages, which include at least: 1) technology that utilizes wearable devices such as wearable computer glasses to automatically scan the environment around a user and identify user interaction objects; and 2) technology that provides alerts and recommendations to a user based on the automatic detection of the user interaction objects, thereby enabling the user to take proactive actions that benefit the user.

Certain embodiments may include none, some, or all of the above technical advantages and practical applications. One or more other technical advantages and practical applications may be readily apparent to one skilled in the art from the figures, descriptions, and claims included herein.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 2A-2C illustrate example user devices that are displaying example alerts, according to certain embodiments;

DETAILED DESCRIPTION

Figure 1:
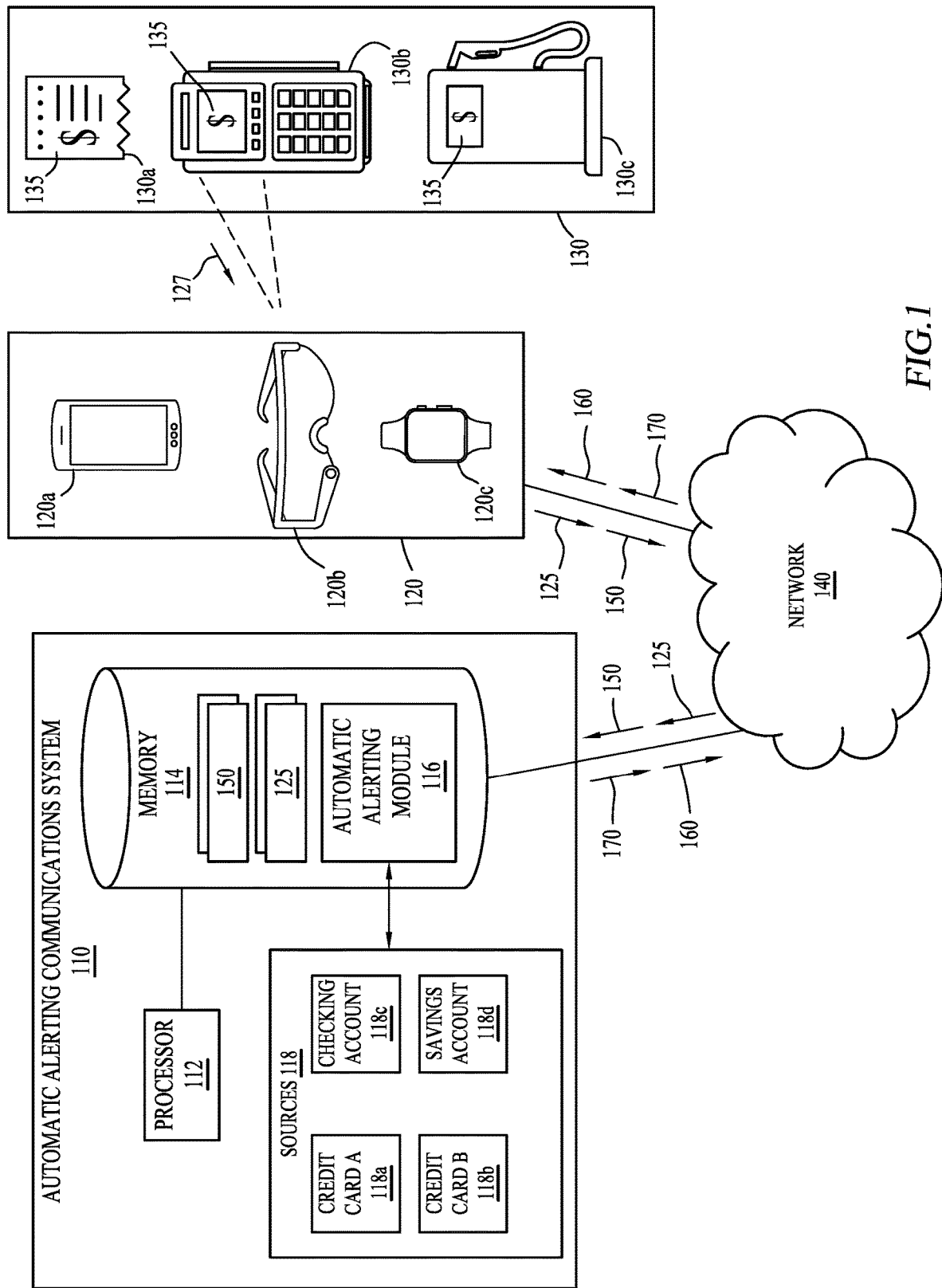
FIG. 1 is a schematic diagram of an example system for automatic alerting communications, according to certain embodiments.
Figure 2C:
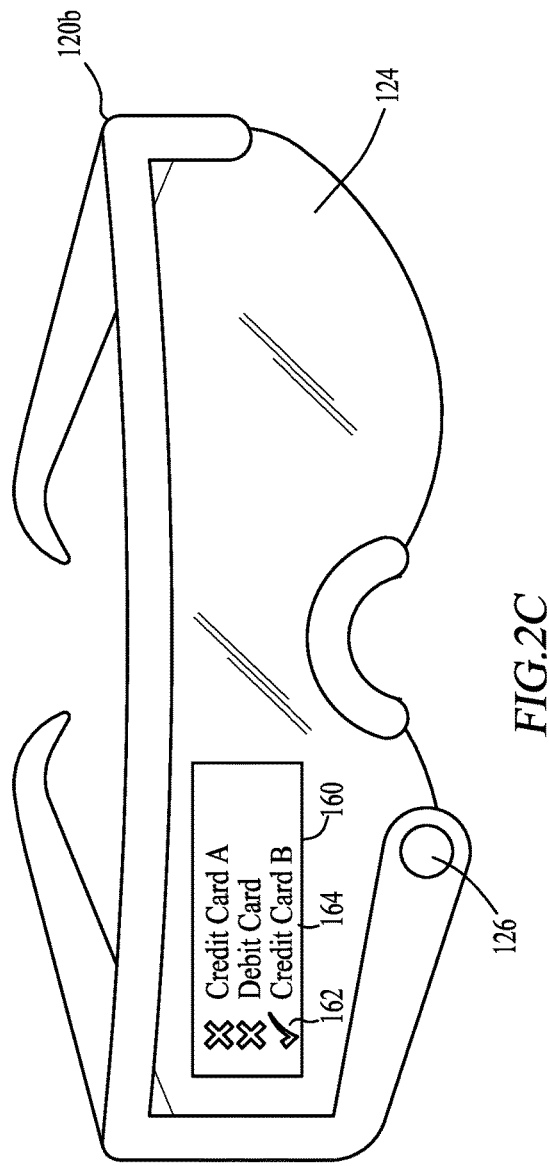
Figure 2D:
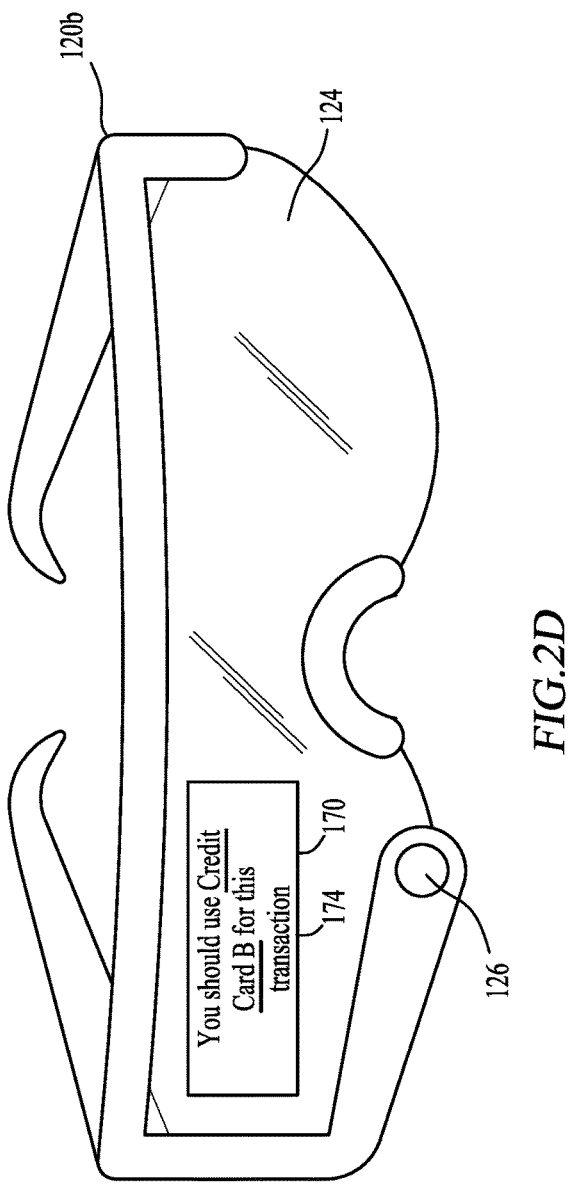
FIG. 2D illustrates an example user device that is displaying an example recommendation, according to certain embodiments.
Figure 3:
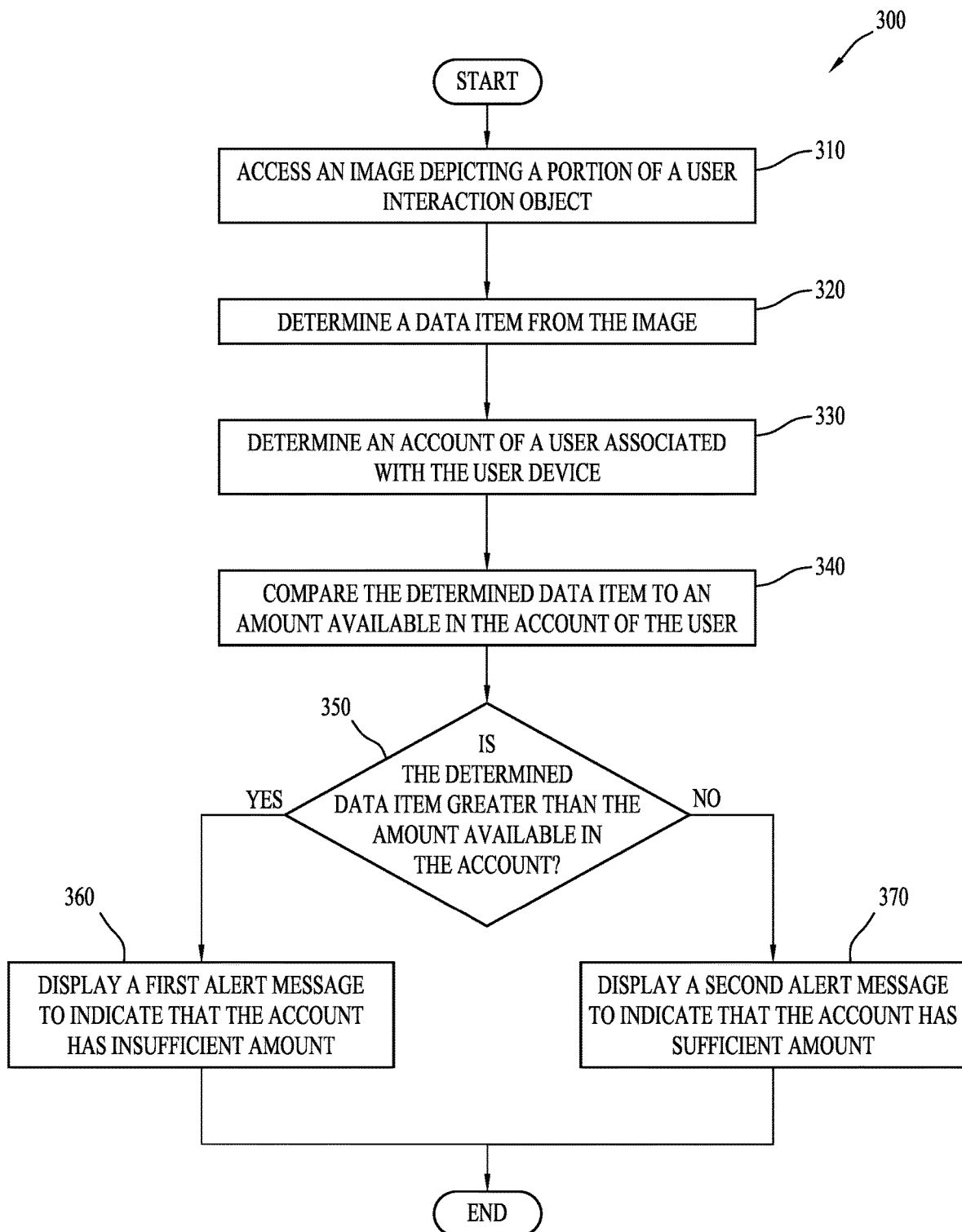
FIG. 3 is a flowchart of a method for automatic alerting communications, according to certain embodiments.

Embodiments of the present disclosure and its advantages are best understood by referring to FIGS. 1 through 3 of the drawings, like numerals being used for like and corresponding parts of the various drawings.

Wearable computing devices are being used with increased frequency by users in everyday life. For example, wearable computer glasses that include a computer system and a camera are being worn by users as they, for example, perform everyday activities. Wearable devices such as computer glasses typically have augmented reality (AR) capabilities where messages and graphics can be displayed to the user directly on the lens as the user views the environment.

This disclosure contemplates utilizing the AR capabilities of wearable computing devices to proactively and automatically alert the user of potentially embarrassing situations while performing everyday activities. For example, an alert message may be automatically communicated to a user's wearable device and displayed to the user using AR based on an automatic detection and identification of user interaction objects in the user's environment. The alert message is discretely and automatically displayed, thereby enabling the user to take proactive action that may, for example, prevent embarrassment to the user.

FIG. 1 illustrates an example automatic alerting communications system 110. As seen in FIG. 1, automatic alerting communications system 110 includes a processor 112, memory 114, and accounts 118 (e.g., 118a-118d). Automatic alerting communications system 110 is communicatively coupled to user devices 120 (e.g., 120a-120c) via a network 140 using any appropriate wired or wireless telecommunication technology.

In general, user device 120 automatically captures a scan 150 of a data item 135 displayed on a user interaction object 130 (e.g., 130a-130c) and transmits scan 150 to automatic alerting communications system 110. Automatic alerting communications system 110 determines data item 135 from scan 150 and compares the data item 135 to one or more accounts 118. Based on the comparison, automatic alerting communications system 110 sends an alert 160 and/or a recommendation 170 for display on user device 120.

Processor 112 is any electronic circuitry, including, but not limited to microprocessors, application specific integrated circuits (ASIC), application specific instruction set processor (ASIP), and/or state machines, that communicatively couples to memory 114 and controls the operation of automatic alerting communications system 110. Processor 112 may be 8-bit, 16-bit, 32-bit, 64-bit or of any other suitable architecture. Processor 112 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 112 may include other hardware that operates software to control and process information. Processor 112 executes software stored on memory to perform any of the functions described herein. Processor 112 controls the operation and administration of automatic alerting communications system 110 by processing information received from user devices 120, network 140, and memory 114. Processor 112 may be a programmable logic device, a microcontroller, a microprocessor, any suitable processing device, or any suitable combination of the preceding. Processor 112 is not limited to a single processing device and may encompass multiple processing devices.

Memory 114 may store, either permanently or temporarily, data, scans 150, user preferences 125, operational software such as automatic alerting module 116, or other information for processor 112. Memory 114 may include any one or a combination of volatile or non-volatile local or remote devices suitable for storing information. For example, memory 114 may include random access memory (RAM), read only memory (ROM), magnetic storage devices, optical storage devices, or any other suitable information storage device or a combination of these devices. Automatic alerting module 116 represents any suitable set of instructions, logic, or code embodied in a computer-readable storage medium. For example, automatic alerting module 116 may be embodied in memory 114, a disk, a CD, or a flash drive. In particular embodiments, automatic alerting module 116 may include an application executable by processor 112 to perform one or more of the functions described herein.

Accounts 118 are accounts that may be utilized for purchasing items such as goods or services. For example, accounts 118 may include a credit card A 118a, a credit card B 118b, a checking account 118c, or a savings account 118d. Each account 118 may be associated with or owned by a particular user and may each have an available amount (e.g., an available balance or an available credit amount). For example, checking account 118c may have an available balance of $100. As another example, credit card A 118a may have a credit limit of $1000 and a balance of $990, leaving an available amount of credit of $10. In some embodiments, accounts 118 (or data associated with accounts 118) are stored in memory 114 or another computer system communicatively coupled to automatic alerting communications system 110.

User devices 120 are any appropriate devices for communicating with components of automatic alerting communications system 110 over network 140. For example, user device 120 may be a smartphone 120a, wearable computer glasses 120b, or a smartwatch 120c. As illustrated in FIG. 2A, user device 120 such as wearable computer glasses 120b may include a display 124, a camera 126, a processor 112, and memory 114. Memory 114 may store a scan module 122 and images 127 captured by camera 126. Scan module 122 represents any suitable set of instructions, logic, or code embodied in a computer-readable storage medium and is described in more detail below.

User preferences 125 are options that are selected and supplied by a user to control one or more functions of automatic alerting communications system 110. In some embodiments, user preferences 125 are selected on user device 120 and sent to automatic alerting communications system 110 where they are stored in memory 114. As one example, user preferences 125 may include an option to enable automatic alerting communications system 110 to automatically send alerts 160 and recommendations 170 to user device 120. As another example, user preferences 125 may include a preferred account 118 for automatic alerting communications system 110 to check as described herein.

User interaction objects 130 are any physical items with which users interact while conducting transactions. As one example, a user may receive a printed receipt 130a (e.g., a "check" or a "bill") while dining at a restaurant. As another example, a user may interact with a point-of-sale (POS) terminal 130b when purchasing items at a grocery store, coffee shop, or other retailer. As yet another example, a user may interact with a gas pump 130c when purchasing fuel for their vehicle. User interaction objects 130 each display a data item 135. Data item 135 may be displayed in electronic format (e.g., on an electronic display of POS terminal 130b) or physically printed on user interaction object 130 such as printed receipt 130a. In some embodiments, data item 135 is an amount owed for a purchase transaction (e.g., $10.99).

Network 140 allows communication between and amongst the various components of system 100. For example, user 102 may use devices 104 to communicate over network 140. This disclosure contemplates network 140 being any suitable network operable to facilitate communication between the components of system 100. Network 140 may include any interconnecting system capable of transmitting audio, video, signals, data, messages, or any combination of the preceding. Network 140 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

In operation of a particular example embodiment, automatic alerting communications system 110 automatically sends an alert 160 and/or a recommendation 170 for display on a user device 120 when an account 118 of the user does not have a sufficient amount to cover the cost of items or services that the user is attempting to purchase. To do so, a user may first enable the automatic display of alerts 160 and/or recommendations 170 using user preferences 125.

Once enabled, scan module 122 of user device 120 begins capturing images 127 of the environment around the user. As one example, wearable computer glasses 120b utilizes camera 126 to capture images 127 and store images 127 in memory 114 of wearable computer glasses 120b. Images 127 may be individual images or may be a collection of images such as a video. In some embodiments, images 127 are captured continuously at a predetermined interval (e.g., once every second). In other embodiments, images 127 are captured based on a predetermined trigger. The predetermined trigger may include using geolocation to determine that the user is at a location such as a retail store or gas station, electronically detecting (e.g., using Bluetooth) the nearby presence of a POS terminal 130b, or after determining that the user has spent a predetermined amount of time at a restaurant (e.g., begin capturing images 127 every second after the user has been at a restaurant for more than fifteen minutes).

Once one or more images 127 are captured and stored on user device 120, scan module 122 accesses and begins analyzing images 127 in order to identify a user interaction object 130. For example, scan module 122 may utilize any appropriate image analysis technique (e.g., deep learning object detection) in order to identify user interaction object 130 within a particular image 127. Once a particular image 127 is identified as depicting a user interaction object 130, scan module 122 identifies the particular image 127 as a scan 150 and sends the scan 150 to automatic alerting communications system 110 via network 140. Automatic alerting module 116 receives scan 150 or otherwise accesses scan 150 from memory 114 and determines a data item 135 from scan 150 (e.g., using optical character recognition). The determined data item 135 is compared to one or more accounts 118 associated with the user in order to determine if the account 118 has a sufficient amount to cover the desired transaction. For example, if user preferences 125 indicate that the user has selected to use checking account 118c for purchase transactions, automatic alerting module 116 compares the determined data item 135 to the amount available in checking account 118c. Automatic alerting module 116 then sends an alert 160 or recommendation 170 via network 140 for display on user device 120 based on the comparison of the data item 135 to the amount available in checking account 118c. For example, if the data item 135 (e.g., $10.99) is greater than the available amount in checking account 118c, an alert 160 such as the alert 160 illustrated in FIG. 2B may be sent and displayed to the user in order to warn the user that checking account 118c does not have enough funds for the transaction. However, if the data item 135 is less than or equal to the available amount in checking account 118c, an alert 160 such as the alert 160 illustrated in FIG. 2A may be sent and displayed to the user in order to alert the user that checking account 118c has a sufficient amount to cover the transaction. As a result, the user is automatically and discreetly informed of which account 118 to use for a transaction before initiating the transaction.

As a particular example of a practical application of automatic alerting communications system 110, consider a scenario where a user is dining at a restaurant and is wearing wearable computer glasses 120b. Typically, if the user attempts to pay the bill for dining at the restaurant using an account 118 that does not have a sufficient amount to cover the bill (e.g., a debit card tied to checking account 118c that has a balance that is less than the restaurant bill), the user may suffer embarrassment when their server returns to their table and informs the user that their transaction has been declined. Using automatic alerting communications system 110, however, the user may be proactively and discreetly informed using alert 160 within wearable computer glasses 120b that their debit card should not be used for the transaction. For example, the user may view alert 160 as illustrated in FIG. 2C on display 124 of their wearable computer glasses 120b a short amount of time after receiving printed receipt 130a from their server but before attempting to pay the data item 135 (e.g., the amount due) displayed on printed receipt 130a. Since alert 160 is displayed to the user prior to the user attempting to pay their dining bill, the user is able to select a different account 118 that has a sufficient amount to cover the bill (e.g., credit card B 118b), thereby avoiding the embarrassment from having a transaction be declined.

FIGS. 2A-2C illustrate example user devices 120 (i.e., wearable computer glasses 120b) that are displaying example alerts 160, according to certain embodiments. As shown in these figures, alert 160 may include one or more alert icons 162 and one or more alert accounts 164. Alert account 164 indicates a particular account 118. Alert icon 162 may be any graphical depiction of a yes/no scenario. For example, as illustrated in FIGS. 2A-2B, alert icon 162 may alternatively be a check mark or an "X". A check mark may be used for alert icon 162 when a particular account 118 indicated in alert account 164 has a sufficient amount to cover data item 135. Conversely, an "X" may be used for alert icon 162 when a particular account 118 indicated in alert account 164 does not have a sufficient amount to cover data item 135. In other embodiments, any other appropriate icon may be used for alert icon 162 to indicate whether or not a particular account 118 indicated in alert account 164 has a sufficient amount to cover data item 135 (e.g., a thumbs up or thumbs down icon, an up or down arrow, and the like).

The alert 160 of FIG. 2C is similar to the alerts 160 of FIGS. 2A-2B except that the alert 160 of FIG. 2C includes multiple alert icons 162 and multiple alert account 164. In this embodiment, the user is provided with a quick overview of which accounts 118 could be used for a transaction. In this particular embodiment, for example, the user can quickly understand that Credit Card A 118a and their Debit Card that is tied to checking account 118c each do not have a sufficient amount to cover data item 135, while Credit Card B 118b has a sufficient amount to cover data item 135. As a result, the user can quickly and easily choose which account 118 to use for a transaction.

FIG. 2D illustrates an example user device 120 (i.e., wearable computer glasses 120b) that is displaying an example recommendation 170, according to certain embodiments. Recommendation 170 includes a recommendation message 174 that recommends a particular account 118 to use for a transaction. Recommendation 170 is similar to alert 160 except that instead of indication whether or not an account 118 has a sufficient amount to cover data item 135 using alert icons 162, recommendation 170 analyzes all available accounts 118 of the user and recommends a particular account 118 to use for the transaction. As a particular example using the scenario of FIG. 2C where Card A 118a and checking account 118c each do not have a sufficient amount to cover data item 135 while Credit Card B 118b has a sufficient amount to cover data item 135, recommendation 170 as shown in FIG. 2D simplifies this information and provides recommendation message 174 of "You should user Credit Card B for this transaction." This further simplifies and improves the user's experience during transactions.

FIG. 3 illustrates a method 300 for automatic alerting communications, according to certain embodiments. In general, method 300 may be utilized by automatic alerting module 116 and/or scan module 122 to automatically provide alert 160 and/or recommendation 170 for display on user device 120. Method 300 may begin at step 310 where method 300 accesses an image depicting a portion of a user interaction object. In some embodiments, the image is image 127 stored in memory 114 of automatic alerting communications system 110 or user device 120. In some embodiments, the user interaction object is user interaction object 130. For example, the user interaction object may be a printed receipt or a POS terminal. The image of step 310 is captured by a camera of user device 120 such as wearable computer glasses, a smartwatch, or a smartphone.

At step 320, method 300 analyzes the image of step 310 in order to determine a data item for the transaction. In some embodiments, the data item is data item 135 and depicts an amount of money the user owes for a transaction. Any appropriate image analysis technique may be used in step 320 to determine the data item (e.g., optical character recognition that searches for terms such as "total," "$", or "please pay").

At step 330, method 300 determines an account of a user associated with the user device. In some embodiments, the account is one of accounts 118. To determine the account of the user, step 330 may analyze a plurality of accounts associated with the user (e.g., accounts 118) and select the account used most frequently by the user. In some embodiments, step 330 may consult user preferences 125 in order to determine the account. For example, a user may indicate via user preference 180 which of their accounts to always utilize for purchase transactions. Method 300 may also in step 330 determine an amount available of the determined account. For example, if the determined account is a checking account, step 330 may determine how much money is available in the checking account. As another example, if the determined account is a credit card, step 330 may determine how much credit is available on the credit card.

At step 340, method 300 compares the determined data item of step 320 to the amount available of the account of the user determined in step 330 and then proceeds to step 350. In step 350, method 300 determines whether the determined data item of step 320 is greater than the amount available of the account of the user determined in step 330. If the determined data item of step 320 is greater than the amount available in the account of the user determined in step 330, method 300 proceeds to step 360. If the determined data item of step 320 is less than or equal to the amount available in the account of the user determined in step 330, method 300 proceeds to step 370.

At step 360, method 300 displays a first alert message on an electronic display of the user device. In some embodiments the first alert message is alert 160. The first alert message includes an indication that the account of step 330 does not have a sufficient amount to cover the determined data item of step 320. The indication may include an icon such as alert icon 162 and/or the name of the account determined in step 330. The first alert message is displayed on the electronic display of the user device prior to any attempted transaction by the user.

At step 370, method 300 display a second alert message on the electronic display of the user device. In some embodiments the second alert message is alert 160. The second alert message includes an indication that the account of step 330 has a sufficient amount to cover the determined data item. The indication may include an icon such as alert icon 162 and/or the name of the account determined in step 330. The second alert message is displayed on the electronic display of the user device prior to any attempted transaction by the user. After step 370, method 300 may end.

One or more steps of method 300 may be performed continuously at a predetermined interval (e.g., once every second) after a user enables automatic alerts using user preferences 125. In some embodiments, one or more steps of method 300 are performed based on a predetermined trigger. The predetermined trigger may include using geolocation to determine that the user is at a location such as a retail store or gas station, electronically detecting (e.g., using Bluetooth) the nearby presence of a POS terminal 130b, or after determining that the user has spent a predetermined amount of time at a restaurant (e.g., begin capturing images every second after the user has been at a restaurant for more than fifteen minutes).

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

As used herein, "automatically" may refer to operations that are performed without any immediately direct user interaction or instructions. For example, scan module 122 of user device 120 may automatically capture scan 150 without any direct instructions from a user. In other words, once initially enabled or approved by the user, scan module 122 may then begin continuously scanning the environment using camera 126 in order to identify a user interaction object 130 and capture scan 150. Once a user interaction object 130 has been identified, scan module 122 captures scan 150, sends scan 150 to automatic alerting communications system 110, receives alert 160 from automatic alerting communications system 110, and displays alert 160 to the user—all without any further user instructions or interactions.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
  a user device of a user, the user device comprising:
    a camera;
    an electronic display;
    a first computer processor;

one or more first memory units;
a scan module stored in the one or more first memory units, the scan module configured, when executed by the first computer processor, to:
  determine a location of the user device;
  detect a trigger in response to:
    detecting that the user device is located within a wireless communication range from a point-of-sale terminal based at least in part upon the location of the user device; and
    determining that a predetermined amount of time has passed since the user device has entered the wireless communication range from the point-of-sale terminal;
  in response to detecting the trigger:
    access a plurality of images captured by the camera, wherein the plurality of images are captured during the predetermined amount of time;
    identify, from the plurality of images, a particular image that depicts a printed receipt or the point-of-sale terminal; and
    transmit the particular image across a wireless communications network;
a computing system comprising:
  a second computer processor;
  one or more second memory units;
  an automatic alerting module stored in the one or more second memory units, the automatic alerting module configured, when executed by the second computer processor, to:
    access the particular image depicting the printed receipt or the point-of-sale terminal;
    determine a data item from the particular image;
    compare the data item to two or more accounts of the user; and
    send instructions to the user device to automatically display a plurality of alert messages on the electronic display based on the comparison of the data item to the two or more accounts, wherein the plurality of alert messages comprises:
      a first alert message indicating that a first account of the user has sufficient amount to cover the determined data item, wherein the first alert message comprises a first alert icon; and
      a second alert message indicating that a second account of the user does not have sufficient amount to cover the determined data item, wherein the second alert message comprises a second alert icon; and
    send a recommendation to the user device, wherein the recommendation comprises a recommendation message that recommends the first account of the user to use to cover the determined data item.

2. The system of claim 1, wherein the user device is:
wearable computer glasses;
a smartwatch; or
a smartphone.

3. The system of claim 1, wherein the plurality of alert messages is selected from the group consisting of:
  an indication that a certain two of the two or more accounts has an insufficient amount to cover the determined data item; and
  an indication that a certain two of the two or more accounts has a sufficient amount to cover the determined data item.

4. The system of claim 1, wherein the plurality of alert messages comprises:
  a list of a plurality of accounts of the user; and
  an indication for each particular account in the list of plurality of accounts of whether or not the particular account has a sufficient amount to cover the determined data item.

5. The system of claim 1, wherein the first alert message comprises a message indicating the first account that the user should use.

6. The system of claim 1, wherein determining the data item from the particular image comprises utilizing optical character recognition.

7. The system of claim 1, wherein the automatic alerting module is configured to send the instructions to the user device to automatically display the plurality of alert messages on the electronic display of the user device prior to any action by the user for the data item.

8. A method, comprising:
  receiving, from a user device across a communications network, a plurality of images depicting a printed receipt or a point-of-sale terminal, wherein receiving a plurality of images is in response to:
    the user device being located within a wireless communication range from a point-of-sale terminal based at least in part upon a location of the user device; and
    a predetermined amount of time being passed since the user device has entered the wireless communication range from the point-of-sale terminal, wherein the plurality of images are captured during the predetermined amount of time;
  analyzing the plurality of images to determine a data item;
  determining two or more accounts of a user associated with the user device;
  comparing the determined data item to an amount available in each of the two or more accounts of the user;
  sending, to the user device, instructions to automatically display a plurality of alert messages on an electronic display of the user device based on comparison of the data item to each of the two or more accounts, wherein the plurality of alert messages comprises:
    a first alert message indicating that a first account of the user has sufficient amount to cover the determined data item, wherein the first alert message comprises a first alert icon; and
    a second alert message indicating that a second account of the user does not have sufficient amount to cover the determined data item, wherein the second alert message comprises a second alert icon; and
  sending, to the user device, a recommendation that comprises a recommendation message that recommends the first account of the user to use to cover the determined data item.

9. The method of claim 8, wherein the user device is:
wearable computer glasses;
a smartwatch; or
a smartphone.

10. The method of claim 8, wherein analyzing the plurality of images to determine the data item comprises utilizing optical character recognition.

11. The method of claim 8, wherein determining the two or more accounts of the user associated with the user device comprises:

analyzing a plurality of accounts associated with the user; and selecting from the plurality of accounts the two or more accounts used most frequently by the user.

12. The method of claim 8, wherein instructions are transmitted to the user device across the communications network to display the first or second alert message on the electronic display of the user device prior to any action by the user for the data item.

13. A non-transitory computer-readable medium storing instructions that when executed by a processor cause the processor to:

access a plurality of images depicting a printed receipt or a point-of-sale terminal, the plurality of images captured by a user device, wherein accessing the plurality of images is in response to:
the user device being located within a wireless communication range from a point-of-sale terminal based at least in part upon a location of the user device; and
a predetermined amount of time being passed since the user device has entered the wireless communication range from the point-of-sale terminal, wherein the plurality of images are captured during the predetermined amount of time;

analyze the plurality of images to determine a data item;

determine two or more accounts of a user associated with the user device;

compare the determined data item to an amount available in each of the two or more accounts of the user;

send, to the user device, instructions to automatically display a plurality of alert messages on an electronic display of the user device based on comparison of the data item to each of the two or more accounts, wherein the plurality of alert messages comprises:

a first alert message indicating that a first account of the user has sufficient amount to cover the determined data item, wherein the first alert message comprises a first alert icon; and a second alert message indicating that a second account of the user does not have sufficient amount to cover the determined data item, wherein the second alert message comprises a second alert icon; and send, to the user device, a recommendation that comprises a recommendation message that recommends the first account of the user to use to cover the determined data item.

14. The non-transitory computer-readable medium of claim 13, wherein the user device is:

wearable computer glasses;

a smartwatch; or a smartphone.

15. The non-transitory computer-readable medium of claim 13, wherein analyzing the plurality of images to determine the data item for a transaction comprises utilizing optical character recognition.

16. The non-transitory computer-readable medium of claim 13, wherein determining the two or more accounts of the user associated with the user device comprises:

analyzing a plurality of accounts associated with the user; and selecting from the plurality of accounts the two or more accounts used most frequently by the user.

17. The non-transitory computer-readable medium of claim 13, wherein instructions are transmitted to the user device across a communications network to display the first or second alert message on the electronic display of the user device prior to any action by the user for the data item.

* * * * *